June 25, 1968 KATSUYA ATSUMI 3,389,869

TAPE DRIVE MOTOR CONTROL ARRANGEMENT

Filed Feb. 24, 1966 2 Sheets-Sheet 1

INVENTOR

KATSUYA ATSUMI

June 25, 1968 KATSUYA ATSUMI 3,389,869

TAPE DRIVE MOTOR CONTROL ARRANGEMENT

Filed Feb. 24, 1966 2 Sheets-Sheet 2

INVENTOR

KATSUYA ATSUMI

United States Patent Office 3,389,869 Patented June 25, 1968

3,389,869

TAPE DRIVE MOTOR CONTROL ARRANGEMENT

Katsuya Atsumi, Tokyo, Japan, assignor to Akai Electric Company Limited, Tokyo, Japan Filed Feb. 24, 1966, Ser. No. 529,709
Claims priority, application Japan, Mar. 3, 1965, 40/12,057
4 Claims. (Cl. 242—55.12)

ABSTRACT OF THE DISCLOSURE

A tape drive control for a magnetic tape recorder includes push buttons for controlling tape drive motors for feeding tape between a take up reel and wind up reel with capstan feed mechanism. A manual switch controls a circuit to the motors and a tension arm pivotally mounted on the recorder bears on the tape between the take up reel and drive reel for sensing termination of the tape or an extremely slackened condition of the tape. The tension arm operates a switch which controls a relay having its contacts in parallel with the manual switch so that the motors continue to run even when the manual switch is open until the tape has been completely wound onto one of the reels. This arrangement also keeps the motors de-energized when one of the push buttons is activated in the absence of tape contacting the tension arm.

This invention relates to improvements in or relating to tape drive motor control arrangements for use with a magnetic tape recording and reproducing machine, hereinafter referred to briefly as a "tape recorder."

With the conventional tape electric drive motor arrangement used in tape recorders, the tape drive or main motor is so arranged that it is brought to "off" whenever a main switch inserted in the motor circuit has been manipulated to "off." Generally speaking, a user of the tape recorder is used to manipulating the main switch to "off" when he has enjoyed any selected one of recorded musical programs or he has completed recording a radio program of the like which he desires to preserve in the form of a record on his magnetic tape threaded on the tape recorder. In such a case as this, the tape is threaded generally around the both tape reels on the tape recorder which necessitates manipulating the switch again for energizing the main and other tape drive motors until the tape will have been completely wound up by the wind-up reel, or conversely to rewind the tape by the tape supply reel. It will be clear that the tape reels can be taken out from the tape recorder when the tape has been completely wound up by either of the reels.

It is the main object of the present invention to provide an improved tape drive motor control arrangement capable of obviating such an additional manipulation of the main switch for continuing the tape winding-up operation until the tape will have been completely wound-up by either tape reel.

In order to attain the aforementioned main object, the tape drive motor control arrangement according to this invention is characterized by the provision of means for allowing the main and other tape drive motors to continue to run even upon a shutting-off manipulation of the main switch until the tape has been completely wound up by either tape reel, and for keeping the motor de-energized even when a tape drive control member such as push button for quick forward feeding, playing, recording or quick rewinding is brought into its operating position without the tape threaded in position on the tape recorder.

These and further objects, features and advantages of the present invention will appear from the following detailed description with reference to the accompanying drawings illustrative of a preferred embodiment of the invention.

Now referring to the accompanying drawings, 10 denotes a chassis panel of a tape recorder which is fitted with the tape drive motor control arrangement according to this invention. A plurality of tape drive control buttons F, P, S, R and B are mounted pivotably on the panel 10 substantially along the lower edge thereof when seen in FIGS. 1, 3 and 4.

Button F serves for fast forward drive of the magnetic tape T, button P for playing or reproducing service; button S for stop control; button R for recording and button B for rewinding service, respectively, as will be described more fully hereinafter.

Figure 1:
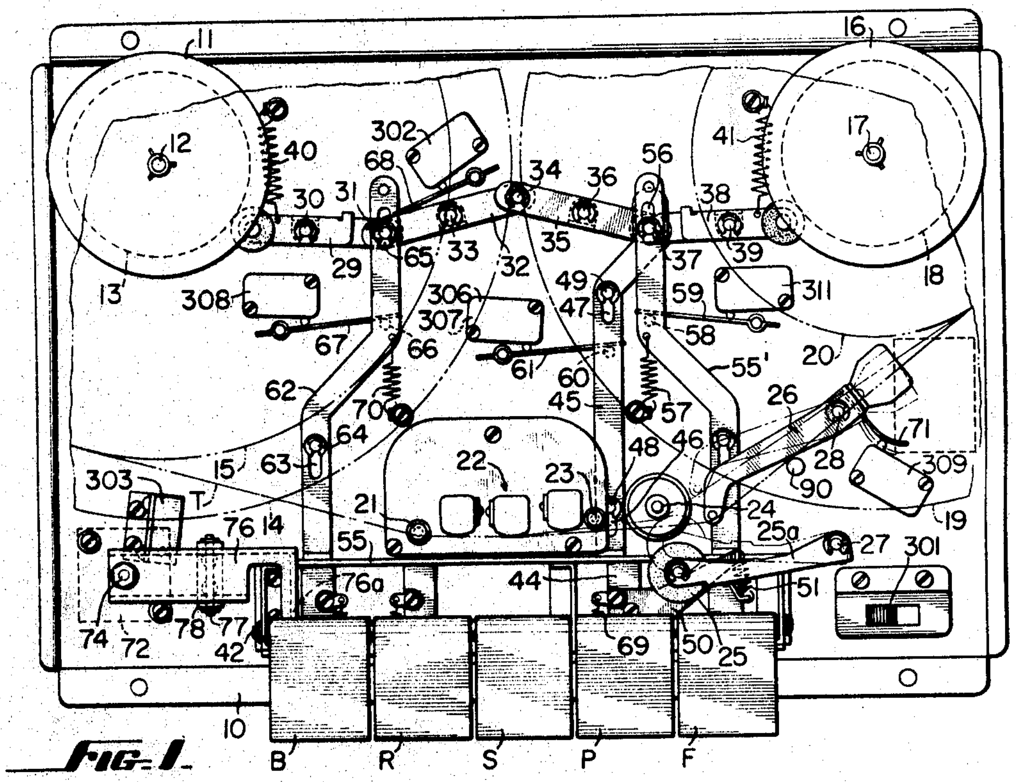
FIG. 1 is a top plan view of the chassis panel of a tape recorder fitted with the motor control arrangement according to this invention, illustrating a condition wherein no push button has been depressed.

Numeral 11 denotes a tape feed turn disc fixedly attached with its shaft 12 which passes rotatably through the panel 10 and driven from a direct-coupled motor M2 (FIG. 2) through the intermediary of a friction clutch 13 shown only schematically by a dotted circle in FIG. 1. As is conventional, the turn disc 11 mounts frictionally a tape reel 14, having a spool as at 15 of the tape T only schematically shown.

Similarly, 16 denotes a tap wind-up turn disc fixedly attached to its shaft 17 which passes rotatably through the panel and is driven from a direct-coupled motor M3 (FIG. 2) through the intermediary of a friction clutch 18, again shown only schematically by a dotted circle in FIG. 1. The turn disc 16 mounts frictionally a tape reel 19, having a spool as at 20 of the tape T which has been threaded from spool 15 past guide post 21; magnetic head group 22; guide post 23; capstan 24 (adapted for cooperation with pressure roll 25 mounted on arm 25*a* which is pivotable at 27); and tension arm 26 pivotally mounted at 28, to the reel 19. The capstan 24 extends rotatably through the panel 10 and is directly coupled with a main drive motor M1 which is shown only schematically in FIG. 2.

Brake arm 29 is pivotable at 30 and arranged so as to cooperate with the peripheral surface of first friction clutch 13 and is linked by means of a connecting pin 31 to a link member 32 at its one end, this link member being pivotable around pin 33 and linked in turn at its one end to second link member 35 through a pin-and-groove connection at 34. The link member 35 is pivotably mounted at 36 and linked by means of a connecting pin 37 to a second brake arm 38 which is mounted in turn pivotable about a pin 39. Tension springs 40 and 41 are provided for brake arms 29 and 38 so as to resiliently urge the latter into contact with the clutch elements 13 and 18, respectively.

Figures 3, 4, 5, 6, 7, 8, 9:
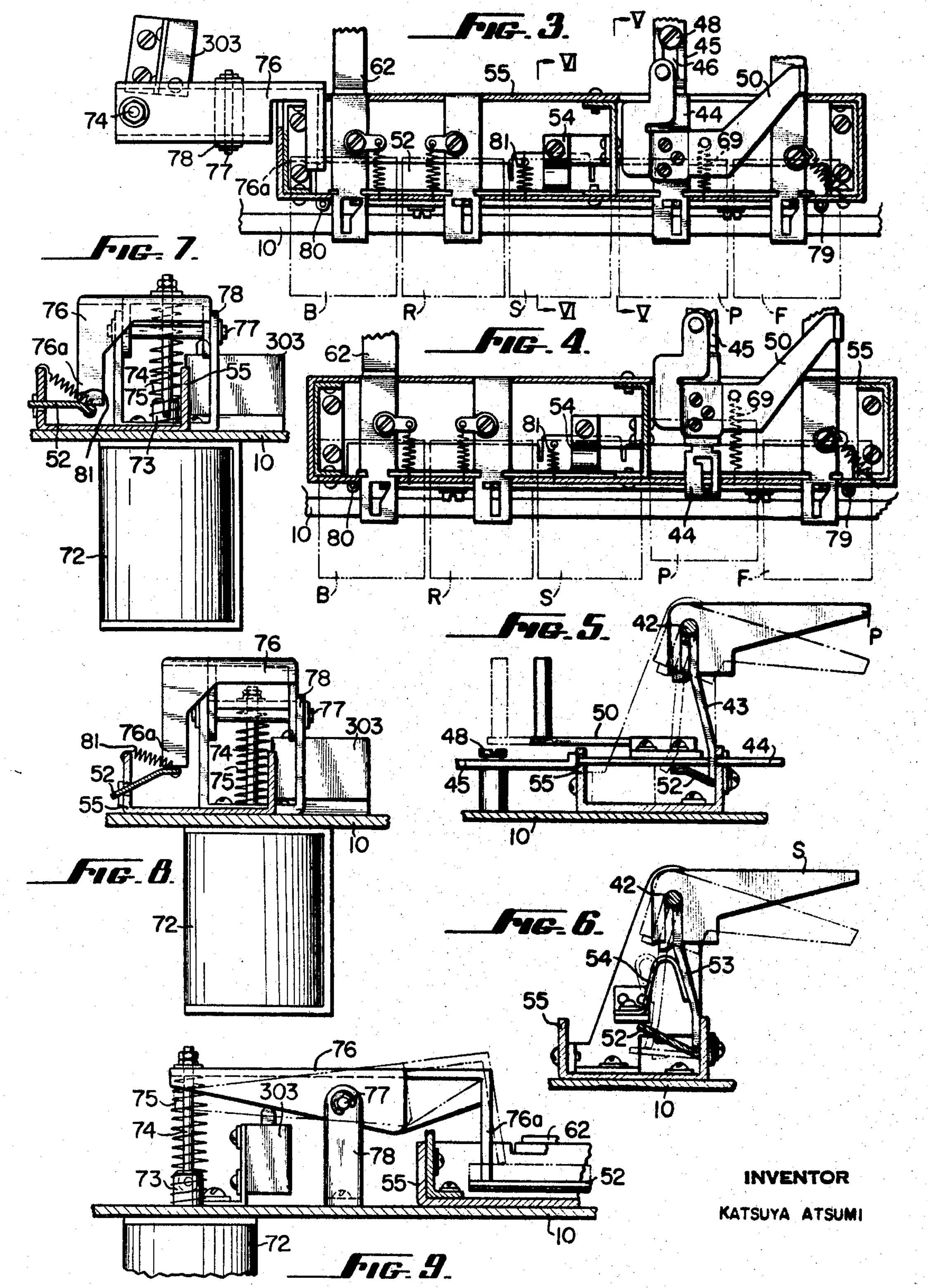
FIGS. 3 and 4 are horizontal and longitudinal sectional views of two positions of push button arrangement for control of the tape drive.
FIGS. 5 and 6 are cross-sectional views of related parts with play and stop control push buttons, respectively, taken on lines V—V and VI—VI shown in FIG. 3.
FIGS. 7 and 8 are end views, of an electromagnetic plunger-operated lock mechanism for control of the push button arrangement.
FIG. 9 is a side view, partially sectioned, of the lock mechanism.

As shown in FIG. 5, play control button P is pivotable about an elongated support bar 42 which is arranged in common to all the push buttons. Button P is provided with a depending stem 43 which is mechanically coupled with a slide 44 capable of shifting in a horizontal plane and is rigidly connected with an operating bar 45 at its one end. For guiding the movement of this bar, the latter is formed with elongated slots 46 and 47 receiving slidably guide pins 48 and 49 (FIG. 1), respectively which are studded on the panel 10. The opposite end of the bar 45 is linked to the connecting pin 37 for cooperation therewith.

Figure 2:
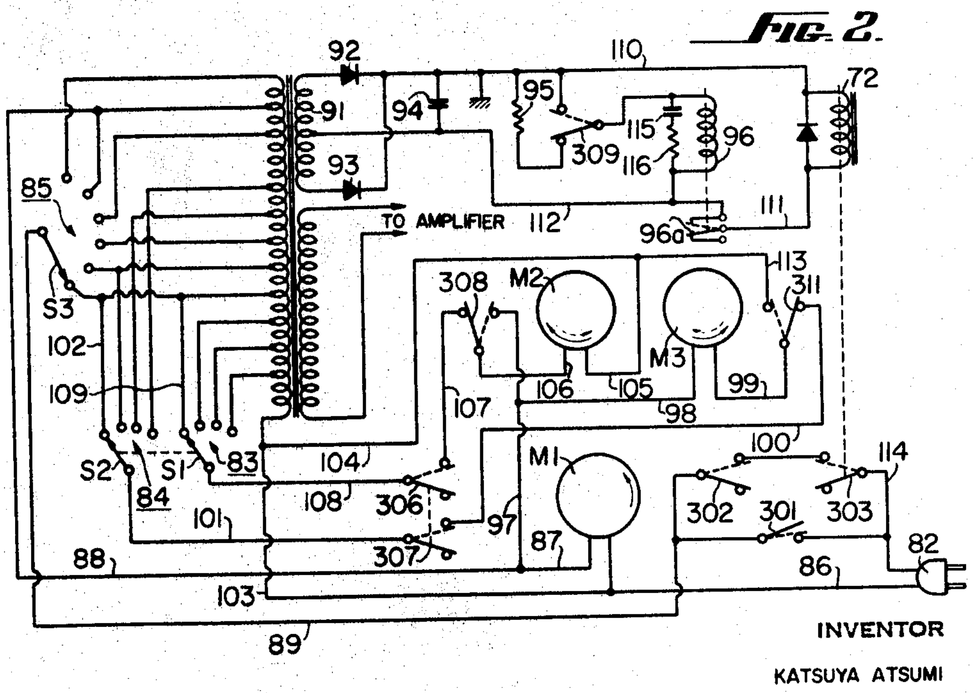
FIG. 2 is a wiring diagram of the motor circuit including the main tape drive motor and two tape reel drive motors.

A pin 60 is fixedly mounted on the bar 45 for the control of a microswitch of duplicate type 306–7 through the intermediary of a pivotable spring plate 61, these switch elements 306 and 307 being also illustrated in the circuit shown in FIG. 2.

Slide 44 is attached fixedly with a lateral arm 50 and a spring 51 is tensioned between the arm 50 and the pressure roller arm 25*a*.

When the play control button P is depressed as shown by corresponding chain-dotted line, the slide 44 and its lateral arm 50 are advanced from left to right in FIG. 5, causing thereby the pressure roller arm 25*a* to turn clockwise in FIG. 1 so that the pressure roller 25 is brought into engagement with capstan 24.

In the normal operating condition wherein the tape T is threaded in the aforementioned way as shown in FIG. 1 schematically, an elongated lock bar 52 is turned clockwise when seen in FIG. 5 against spring action, which will be described more in detail hereinafter, in the course of the depressing manipulation of the button P. The latter is then kept in its locked condition by the abutting engagement with the sprung-back bar 52. This locked position of the button P is clearly shown in FIG. 5 by chain-dotted lines.

Stop button S is also formed with a depending leg 53 and resiliently urged by a spring 54 against a side wall of an elongated small frame 55 having a channel-shaped cross-section as shown in FIGS. 5–8 and fixedly mounted on the panel 10. This button serves, when depressed, for swiveling the lock bar 52 clockwise in FIG. 6 so as to release any one or more locked push buttons, if any. When the depressing finger pressure is released, stop button S will automatically return to its resting position under the influence of return spring 54.

Fast forward drive control button F has substantially similar construction in its principle with that of the button P, except the released parts thereof for cooperating with the pressure roller arm 25*a*. An operating bar 55′ is linked at its rear end to the button F and formed at its front end with an elongated slot 56 which receives slidably the aforementioned pin 37.

A pin 58 is fixedly attached to the operating bar 55′ for the control of a microswitch 311 through the intermediary of a pivotable spring plate 56 for energizing or de-energizing the tape winding motor M3. See also FIG. 2.

Record control button R is provided with a similar stem and a coupled slide therewith, to those denoted by 43 and 44 in the foregoing, but not with any operating bar linked with the brake mechanism proper. This button serves for switching amplifiers and the like electronic components, not shown, of the tape recorder, and a recording operation can be initiated by depressing both buttons P and R, simultaneously.

Rewinding control button B is mechanically connected with operating bar 62 having an elongated slot 63 which receives slidably a guide pin 64 studded on panel 10. The forward end of the bar 62 is also formed with a slot 65 kept in slidable engagement with pin 31 for establishing link connection with the brake system.

Operating bar 62 mounts fixedly a pin 66 serving for the control of a microswitch 308 through the intermediary of pivotable spring plate 67, said switch 308 being provided for initiating and stopping the operation of tape feed motor M2 as shown in FIG. 2.

A further microswitch 302 is provided as shown so as to control the operation of main drive motor M1, and this switch is in turn operated by pin 31 (FIG. 1) through the intermediary of a pivotable spring plate 68.

Return springs 57, 69 and 70 are provided for operating the bars 55, 45 and 62, respectively. Tension arm 26 is provided with a spring arm 71 for the control of a microswitch 309 which is inserted in the circuit shown in FIG. 2 for energizing and de-energizing an electromagnet 72, shown more specifically in FIGS. 7–9, and fixedly mounted on the lower surface of chassis 10. Magnet 72 is adapted to actuate its plunger 73 to which is linked a vertical rod 74 urged in the upward direction by means of a compression spring 75. The rod 74 is linked with a pivotable releaser 76 which is mounted about a pivot shaft 77 mounted in turn in the upper end of a stand 78. This stand is, as shown in FIGS. 7–9, fixedly mounted on the chassis panel 10. A depending arm 76*a* is formed integrally with the releaser 76 and kept in pressure contact with one end of lock bar 52 which is povitable about two hinge points 79 and 80. A return spring 81 is provided as shown in FIGS. 7–8 so as to urge the bar 52 toward its non-locking position illustrated in FIG. 8. A main switch 301 is mounted on the right-hand lower corner of the panel 10 in FIG. 1 and inserted in the circuit shown in FIG. 2 so as to manually on-off control of the circuit which is adapted to be connected through the intermediary of a plug 82 to an A.C. current source, not shown.

The operation of the above-mentioned arrangement is as follows:

When it is desired to operate the tape recorder, the combined selector switch S1–S2 and the single selector switch S3 are adjusted beforehand manually to suitably selected mating taps 83, 84 and 85, respectively, so as to meet the occasional load condition of the machine which varies depending upon the tape reel size. By manipulating these switches in the clockwise direction in FIG. 2, the load condition may be of smaller size reels, and vice versa. Then, plug 82 is connected to the A.C. power source and main switch 301 is manually closed from its full line to dotted line position as shown in FIG. 2. Currents will therefore flow from plug 82 through conductors 86, main motor M1, conductors 87 and 88, selected one of taps 85, switch S3, conductor 89 and now closed switch 301 back to plug 82, thus the motor M1 is energized and the capstan 24 is kept in rotation at a predetermined speed and in the counter-clockwise direction in FIG. 1.

Next, tape feed reel 14 and tape wind-up reel 19 are placed on the turn discs 11 and 16, respectively, and the tape end drawn out from the wound tape spool 15 is threaded as in the aforementioned way to the wind-up reel. In this case, however, the tape T is generally in its loosened state so that the tension arm 26 is resiliently kept in engagement with a stop pin 90 studded on the board, under the influence of resilient force exerted from within the interior of switch 309 which is provided therein as conventionally with a returning spring and a push button urged thereby, although not appearing in the drawings. Naturally, this push button of the switch is kept in resilient engagement with the actuator spring 71 projecting from tension arm 26. Under these conditions, the switch 309 is in its one position shown by full line in FIG. 2.

Currents therefore will be supplied from the primary side of transformer D to rectifier circuit including secondary coil element 91, diodes 92 and 93 and ripple-suppressing condenser 94, thence through resistor 95 and switch 309 to relay coil 96. On account of the insertion of said resistor 95, the relay coil 96 is not fully actuated and its contact 96*a* is kept in off-position shown by full line in FIG. 2 so that electromagnetic plunger 72 is not actuated. In this case, switch 303 is kept in its off-position as shown by full line in FIG. 2, which means that lock bar 52 is kept in its non-lock position.

Under these conditions, any one of the push buttons F, P, S, R and B cannot be locked after release of a finger pressure applied thereto for intentional and selective control of operation of the machine. Therefore, the tape recorder cannot be operated for an extended time period unless one of three push buttons F, P and B is kept depressed by a finger pressure continuously.

Even when tape reels 14 and 19 are placed on respective turn discs 11 and 16, respectively, and the tape end is threaded from spool 15 through several parts including tension arm 26 to wind-up reel 19 in the aforementioned way, the arm 26 remains in engagement with stop pin 90 as before, on account of generally slackened condition of tape T.

Now assuming that the play button P is depressed so as to initiate a play-back operation of the machine, operating lever 45 is advanced in the upward direction when seen in FIG. 1, thereby the connecting pin 37 being moved upwardly for turning, at first, brake arm 38 against spring action 41 in the releasing or clockwise direction in the same figure. This releasing operation is transmitted through connecting links 35 and 32 to another brake arm 29 which is thus caused to turn against spring action 40 in its releasing direction with a short time lag in comparision with the release of the first brake arm 38. Thus, the both reel shafts 12 and 17 are kept in their freely rotatable condition.

With advance of slide 44 caused by the said manual depression of play button P, arm 25*a* is rotated clockwise in FIG. 1 so as to bring pressure roller 25 into pressure contact with now rotating capstan 24 with the tape T kept pinched therebetween, thereby the tape being fed in its forward drive direction at a predetermined relatively low running speed.

At the same time, the pin 60 on the operating bar 45 will act through spring plate 61 upon the double switch 306–7 so as to close from their off-position to "on," more specifically from their full lined position to dotted line one shown in FIG. 2. Thus, currents will flow from conductor 87 through conductors 97 and 98 to take-up motor M3. Thence, currents flow through conductor 99, switch 311 (now occupying its full line position shown in FIG. 2), conductor 100, now closed switch 307, conductor 101, switch S2, conductor 102, switch S3, conductor 89 and main switch 301 to plug 82, thereby the motor M3 being driven counter-clockwise in FIG. 2 as shown by a small arrow.

Simultaneously, currents will also flow through conductors 86, 103, 104 and 105 to tape feed motor M2 for turning the latter clockwise as shown by a small arrow for the purpose of exerting on the tape feed reel 11 a slight braking torque for tensioning the tape T, while the return circuit of motor M2 is constituted by conductor 106, switch 308, conductor 107, switch 306, conductor 108, switch S1, conductor 109, switch S3, conductor 89, switch 301 and plug 82. This tape tension will cause the tension arm 26 to rotate a small angular distance about its pivot 28, more specifically from its full-lined position to chain-dotted position shown in FIG. 1, thereby switch 309 being transferred from its full-lined to dotted position shown in FIG. 2. In this way, relay coil 96 is fully energized and its contact 96*a* is caused to move from its full-line "off"-position to dotted line position. Thus, rectified current will be supplied from the aforementioned rectifier circuit through conductor 110 to plunger coil 72, thence returning therefrom through conductor 111, contact 96*a* and conductor 112 to the secondary winding element 91. By the energization of coil 72, switch 303 is turned "on." At the same time, plunger 73 and pin 74 are drawn downwards, thus occupying their lowered position, which action will be well understood by comparison of FIG. 8 with FIG. 7, thereby lock bar 52 being transferred from its non-locking to its lockable position. Therefore, the push button P depressed manually in the aforementioned way, can be positively kept in its depressed position as shown by chain-dotted line in FIG. 5, and the play-back operation of the machine will be continued, until the stop control button S is depressed, or the termination of tape T will be brought about. If a considerable slack should take place in the tape T, the machine will automatically stop through the sensing operation of the tension arm 26, as will be more fully described hereinafter. When stop push button S is depressed, the lock bar 52 will be brought from its lockable position to its non-locking position through the intermediary of the stem of the button, thereby the operating bar 45 being caused to return to its initial position under the influence of return spring 69. In this case, the brake system is also shifted from its non-operating position to its applied position shown in FIG. 1. Thanks to the intentional provision of considerable play or lost motion in the connecting linkage, the brake arm 29 at the tape feeding side is caused to return initially and then the brake arm 38 at the tape wind-up side will return to its applied position. By this means, disadvantageous slackening of the tape will be positively avoided. Other operational elements such as pressure roller arm 25*a*, switches 306–7 and the like are brought back to their initial position.

When fast forward push button F is depressed so as to advance the operating bar 55, the brake system including arms 29 and 38 is released as in the case of play control button P. In addition, switch 311 is operated through the intermediary of pin 58 and spring plate 59, thereby shifting from full-line to chain-dotted line position in FIG. 2, thus a feed circuit including conductors 113 and 99 and switch 311 is established so as to feed more strong current to the take-up motor M3. The pressure roller 25 is kept also in its disengaged position from the cooperating and rotating capstan 24. Therefore, the tape T is wound-up at a predetermined faster speed by the related reel 19.

It is to be noted that whenever the brake system is released from its applied to its free position, switch 302 is caused to shift from its off- to "on"- position, thereby a by-pass circuit 114 across the main switch 301 is kept alive, provided that the tension arm 26 is sensing the tightened condition of the tape and thus the plunger-operated switch 303 is maintained in its closed position.

When rewinding button B is depressed, the operating bar 62 is equally advanced so as to release again the brake system from its applied position.

In addition, switch 308 is caused to shift from its full-line to its dotted line position so that, as will be easily understood, reverse current will be supplied to motor M2, thus the tape T will be rewound by the related tape reel 14 at a predetermined fast speed and in the reverse direction relative to the forward tape drive direction so far described.

When the tension arm 26 senses either a termination or a considerable slack of the tape regardless of the running direction thereof, the arm 26 is caused to swivel in the counter-clockwise direction when seen in FIG. 1 thereby switch 309 is returned from its dotted line to full-lined position shown in FIG. 2. In this case, however, a delay circuit formed across relay coil 96, comprising condenser 115 and resistor 116 will become effective so that the return of coil 96 from its fully energized to its partially energized condition will take place with a short time delay, say, 1–2 seconds, and de-energization of plunger coil 72 will be accomplished according to the same operating principle.

Especially at the commencement of tape drive, regardless of the selected kind thereof, the tension arm will generally be subjected to fluctuative oscillation. The provision of the aforementioned time lag will be highly effective to avoiding frequent stoppage of the machine, which is caused to take place on account of high sensitivity of the tension arm. The time lag will further contribute to stop the machine only when the tape end has been completely wound-up by either tape reel, which action is especially predominant when the machine operates at a slower tape running speed as in the case of regular recording or reproducing operation of the machine.

Even when the main switch 301 has been interrupted, the motor circuit will be kept energized, provided that there is a tape threaded in the regular way under tension, because, in this case, switches 302 and 303 are kept closed so that the by-pass circuit 114 is established across the main switch. Only when the tape has been completely wound-up by either tape reel, will the power source become interrupted by the actuation of plunger coil 72 so as to open the related switch 303.

In the foregoing the invention has been described in reference to a specific, illustrative arrangement. As will be understood, various changes may be made in the form of details, arrangement and proportion of parts, etc., without departing from the broader spirit and scope of the invention as set forth in the appended claims.

What we claim is:

1. A tape drive control arrangement for a magnetic tape recorder including a tape-reeling mechanism comprising a tape feed reel and a tape wind-up reel; a magnetic tape threaded therebetween; a capstan feed mechanism for said tape; at least one tape drive electric motor adapted for driving each of said mechanisms; a plurality of tape drive control members for selective control of said motors and a manual switch in the motor circuit for on-off control of the current feed to said motors; the improvements comprising the combination of: a tension arm pivotally mounted on said tape recorder for sensing a termination of or a considerably slackened condition of the tape; an electromagnetic plunger electrically controlled by said tension arm; and a switch controlled by said plunger and electrically connected across said manual switch, thereby allowing said motor to continue to run even when said manual switch is open until the tape will have been completely wound up by either of said reels, and for keeping at least one motor de-energized even when one of said tape drive control members is brought into its operating position in absence of the tape threaded in position on the tape recorder.

2. A tape drive control arrangement of a magnetic tape recorder, including a tape-reeling mechanism comprising a tape feed reel and a tape wind-up reel; a magnetic tape threaded therebetween; a capstan feed mechanism for said tape; at least one tape drive electric motor adapted for driving each of said mechanisms; a plurality of tape drive control members for selective control of said motors and a manual switch in the motor circuit for on-off control of the current feed to said motor; the improvements comprising the combination of: a tension arm pivotally mounted on said tape recorder for sensing a termination of or a considerably slackened condition of the tape; an electromagnetic plunger electrically controlled by said tension arm; a switch controlled by said plunger and electrically connected across said manual switch; and a relay connected in parallel with said plunger for causing the latter instantly to be energized when said tension arm senses a tightened condition of said tape and to be de-energized with a time lag when said tension arm senses a termination, breakage or a slackened condition of said tape, thereby allowing said motor to continue to run even when said manual switch is open until the tape will have been completely wound up by either of said reels, and keeping said motor de-energized even when one of said tape drive control members is brought into its operating position in absence of the tape threaded in position on the tape recorder.

3. The combinatoin as set forth in claim 2, further comprising a time delay circuit connected in parallel with said relay, said circuit comprising a condenser and a resistor.

4. A tape drive control arrangement for a magnetic tape recorder, including a tape-reeling mechanism comprising a tape feed reel and a tape wind-up reel; a magnetic tape threaded therebetween; a capstan feed mechanism for said tape; a plurality of tape drive electric motors adapted for driving both said mechanisms; a plurality of tape drive control push buttons for selective control of said motors and a manual switch in the motor circuit for on-off control of the current feed to said motors; the improvements comprising the combination of: a tension arm pivotally mounted on said tape recorder for sensing a termination of or a considerably slackened condition of the tape; an electromagnetic plunger electrically controlled by said tension arm; a switch controlled by said plunger and electrically connected across said manual switch; and an elongated and pivotal lock bar arranged for mechanical cooperation with said push buttons and controlled by said plunger, said bar being so arranged to lock any selected one of said push buttons while said plunger is electromagnetically operated, and to release any one or more depressed push buttons from their locked position when said plunger is released from said operating position; thereby allowing said motors to continue to run even when said manual switch is open until the tape will have been completely wound up by either of said reels, and for keeping at least one of said motors de-energized even when one of said tape drive control push buttons is brought into its operating position in absence of the tape threaded in position on the tape recorder.

References Cited

UNITED STATES PATENTS

| | | | |
|---|---|---|---|
| 2,685,950 | 8/1954 | Demby | 242—57 |
| 2,954,940 | 10/1960 | Herrmann | 242—55.12 |
| 3,263,038 | 7/1966 | Walker | 200—61.13 |

LEONARD D. CHRISTIAN, *Primary Examiner.*